United States Patent
Seres et al.

(10) Patent No.: US 6,432,350 B1
(45) Date of Patent: Aug. 13, 2002

(54) FLUID COMPRESSION OF INJECTION MOLDED PLASTIC MATERIALS

(75) Inventors: Tristan Seres, Royal Oak; John D. Blundy, Clarkston, both of MI (US); James W. Hendry, Brooksville, FL (US)

(73) Assignee: Incoe Corporation, Troy, MI (US)

( * ) Notice: Subject to any disclaimer, the term of this patent is extended or adjusted under 35 U.S.C. 154(b) by 129 days.

(21) Appl. No.: 09/593,198

(22) Filed: Jun. 14, 2000

(51) Int. Cl.[7] ............................ B29C 43/00; B29D 24/00

(52) U.S. Cl. ........................ 264/500; 264/572; 425/130

(58) Field of Search ................................ 264/500, 572; 425/130

(56) References Cited

U.S. PATENT DOCUMENTS

| | | | |
|---|---|---|---|
| 5,232,711 A | | 8/1993 | Hendry |
| 5,730,926 A | * | 3/1998 | Matsumoto et al. ........ 264/500 |

* cited by examiner

*Primary Examiner*—Suzanne E. McDowell (57) ABSTRACT

An injection mold apparatus having two halves, a core portion and a cavity portion. One or more gas injection devices, such as porous metal devices, are located in either of the two portions of the mold. Once a charge of hot melted plastic is injected into the mold cavity, gas is injected through gas injection devices forcing the hot plastic against the opposite mold half and into any recesses and grooves. Gas seals are formed by the plastic to prevent gas in the mold cavity from reaching the exterior surface of the molded part during shrinkage of the plastic. The centers of mass of the plastic at rib intersections are optimally positioned to eliminate sink marks on the external finished surfaces of the molded parts.

9 Claims, 4 Drawing Sheets

FLUID COMPRESSION OF INJECTION MOLDED PLASTIC MATERIALS

TECHNICAL FIELD

The present invention relates to plastic injection molding apparatus and processes in which gas is injected into the mold cavity along one side of the molten resin being molded into a part and forcing it against the other mold half.

BACKGROUND OF THE INVENTION

In plastic injection molding systems, the injection molds typically include a stationary half and a moving half (i.e. the core side and cavity side). The two halves are closed and clamped together to form a mold cavity for shaping articles from molten plastic materials. Plastic materials are heated into molten condition in an injection molding machine and injected under pressure through a nozzle and into the mold cavity by means of a screw ram. The plastic is allowed to cool sufficiently to harden it before the mold is opened and the articles removed.

One typical plastic injection molding problem is the formation of surface distortion or "sink marks" on the appearance side of the final product. Sink marks are typically caused by ribs or bosses on the opposite side (or "backside") of the part resulting from contraction or shrinkage of the plastic material during cooling. Further, warpage or part distortion can result from high injection pressures that are commonly used to fill the mold cavity, the pack out pressures, or from uneven pressure gradients resulting from the injection pressure at the gate being higher than the pressures at the outer ends of the molding. High injection pressures can also cause strain marks or warpage in the final product. Further, when ribs are formed in the molding, shrinkage differentials can cause the ribs to buckle or bend the molded part. For large molded articles where the plastic cannot flow from a single gate to the end of the molding, hot runner systems are used together with high clamping forces to hold the mold halves together. These molds are expensive and the runners may add weld lines to the products. Also, injection molding machines of a size sufficient to provide the requisite high clamping forces are expensive to acquire and costly to operate.

In gas-assisted injection molding processes an inert gas is injected directly into the melted plastic material in the mold creating hollow sections or cavities in the part. The gas, which typically is an inert gas such as nitrogen, is injected either through the plastic injection nozzle, or through one or more separate injection pin devices positioned in one or both of the mold sections. Gas-assisted injection molding processes can minimize sink marks and warpage to a certain extent since the gas can be directed through the bosses or ribs on the backside of the molded part. Such ribs or bosses, however, must be designed to be relatively thick in order to direct the gas through a channel. This is the opposite of normal design practice with plastic injection molding processes where ribs are preferably made as thin as possible in order to minimize or eliminate warpage and shrinkage, and also to decrease product cycle times.

There are some plastic injection molding processes and systems known today which inject gas on one side of the hot plastic material in the mold in order to force or compress the plastic material against the opposite side of the mold in an attempt to create a solid injection molded part with an improved surface finish. Such systems are shown, for example, in U.S. Pat. Nos. 5,439,365 and 5,273,707. These methods and systems have been known to produce injection molded parts without internal voids and with sink-free surfaces. There still is a need, however, to provide plastic injection molded processes and systems which utilize gas pressure and produce solid injection molded parts in an improved manner and with improved sink-free surface finishes.

Thus, it is an object of the present invention to provide an improved process for manufacturing solid plastic injection molded parts with sink-free surfaces and Class A finishes. It is another object of the present invention to provide injection molded parts without any internal voids, witness marks or weld lines, and does not require venting of the fluid pressure within the molded part.

It is also an object of the present invention to provide an injection molded, gas compressed, dimensionally stable, plastic part having reduced wall thicknesses, without the need for thick reinforcing ribs or internal gas cavities. It is a still further object of the present invention to provide an injection molding process that it is efficient, requires less pressure to form a part, reduces the clamping forces needed to retain the mold halves together, obviates venting, and uses at least part of the forming pressure to assist in the ejection of the finished part upon opening of the mold.

It is still another object of the present invention to provide a self-sealing arrangement during molding and curing to prevent the forming gas from either migrating around the plastic which would otherwise force the molded plastic away from the mold cavity surface used to form the finished surface, or from escaping across the part line of mold sections and outwardly from the mold cavity.

These and other objects, purposes, and advantages of the present invention will become apparent from a review of the following summary and description of the invention, when viewed in accordance with the attached drawings and appended claims.

SUMMARY OF THE INVENTION

A method and apparatus for fluid compression of injection molded plastic materials are provided to form strain-free parts without external voids and with superior finishes and sink-free surfaces. Stationary and movable mold portions define a mold cavity of the shape of the desired part. At least one plastic injection valve or sprue member is positioned in the mold for injecting melted plastic into the mold cavity. At least one gas injection device for introducing pressurized gas into the cavity is also positioned in one of the mold halves. Pressurized inert gas, such as nitrogen, is introduced into the gas injection devices and into the mold cavity following the injection of plastic. The gas operates to uniformly force the molten plastic away from one of the mold surfaces against another mold surface to form a finished outer surface on the part. It is also possible in accordance with the present invention to provide the pressurized gas only at preselected portions or areas of the backside of the molded part.

To prevent gas from escaping from the mold cavity and from migrating around the inner surface of the injected plastic to the finished outer surface of the part, seals are formed around the ejector pins and along the outer edges or ends of the part. Continuous recesses are formed in the mold surfaces encircling the ejector pins. The recesses receive thermoplastic forced into them during the injection step and the pressurized gas acts to continuously force the thermoplastic against walls of the recesses during cooling and shrinkage of the plastic material, thereby forming a seal ring that extends along the inner surface of the molding and prevents gas from escaping from the cavity and/or migrating to the other side of the part. If a moveable slide core member is utilized in the mold, for example, to create an undercut portion or area in the molded part, a small sealing groove is provided around the perimeter of the slide core member in order to prevent gas from leaking.

The thickness of the bosses or ribs formed on the inner side of the molded part have the same thickness as, or are slightly thicker than, the thickness of the outer wall of the molded part. The preferred ratio of these thicknesses is 1.4:1 to 1.0:1. In addition, the points of intersection between the bosses or ribs on the one hand and the wall of the molded part are formed without radiuses or fillets. With these features, the centers of mass of the plastic material at the intersections of the walls and bosses or ribs is positioned closer to the outer surface of the wall thereby eliminating shrinkage and sink marks.

In addition, the recesses around the gas injector devices which provide the gas seal must be sufficiently large to allow filling quickly with the plastic material, but sufficiently small in order to cool and harden quickly such that the gas pressure will provide a satisfactory seal.

In a further embodiment of the invention, the present invention can also be used in combination with internal gas assist injection molding. The gas pins can be positioned sufficiently close to a wall or fillet, or a groove can be formed in the mold, such that gas injected through a gas pin against the backside of the part also is directed or migrates into the wall or fillet in order to form an internal gas channel in the wall or fillet.

DESCRIPTION OF THE PREFERRED EMBODIMENT(S)

Referring now to the drawings, in accordance with the present invention, a representative mold apparatus and process are used to form a molded plastic structural part having a sink-free Class A exterior finish. It is to be understood that the use of the invention as shown and discussed herein is only representative or exemplary of the manner in which it can be used and is not to be limited to the structure or process illustrated and described herein. The present invention, for example, could be used to form parts having different configurations, with several reinforcing ribs, or bosses, or in combination with other structural details, such as wall portions and the like. In addition, in accordance with the present invention, the gas can be introduced from either side of the mold cavity, with only one of those alternatives being illustrated for reference purposes.

Figure 1:
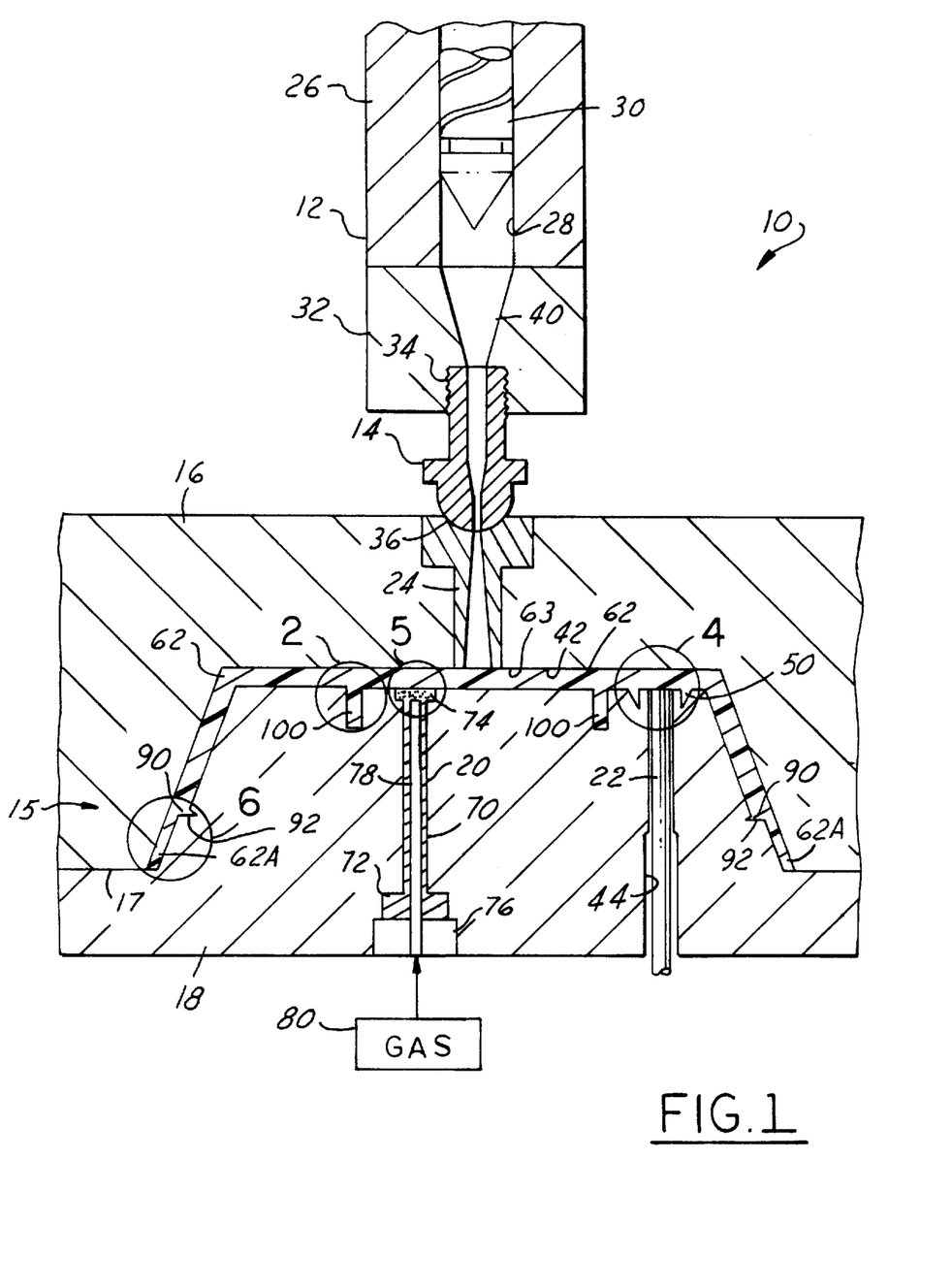
FIG. 1 is a cross-sectional elevational view illustrating an injection molding machine and mold utilizing the present invention.

Turning now to FIG. 1, an exemplary plastic injection molding system and process in accordance with the present invention is indicated by the reference numeral 10. The system 10 has an injection molding machine 12, a nozzle member 14, and a mold 15 with two mold halves or portions, 16 and 18. One or more gas injector devices 20, as well as one or more ejector pins 22, are positioned in mold half or portion 18. A sprue bushing 24 is positioned in mold half or portion 16.

The injection molding machine 12 can be of any conventional type and typically includes a screw barrel 26 with a cavity 28 in which a screw ram 30 is positioned. An injector head 32 is typically positioned on the forward end of the injection molding machine 12 in order to provide a transition from the screw cavity 28 to the nozzle 14. Typically, the nozzle 14 is attached to the injection molding machine by thread members 34.

When the injection molding process is about to begin, the injection molding machine 12 is moved up tightly against the mold such that the nozzle 14 is positioned in the spherical recess 36 in the sprue bushing 24. In this manner, the plastic material 40 in the barrel of the injection molding machine 12 has an open passageway through the nozzle and sprue bushing into the mold cavity 42. The screw ram 30 is used to force the molten plastic material 40 in the injection molding machine 12 through the nozzle 14 and sprue bushing 24 and/or hot runner system into the mold cavity 42. It is understood, of course, that any type of conventional injection molding process and system can be utilized, such as one that includes a manifold and hot runner mechanism and/or multiple sprue bushings positioned in the mold in communication with a mold cavity.

The mold half or portion 16 is also called the "mold cavity" portion while the mold half or portion 18 is also called the "mold core" portion. It is also understood that any type of mold can be utilized with any size or shape of cavity in order to form any size or shape of molded plastic part in accordance with the present invention. The particular mold and mold cavity shown in FIG. 1 are only representative of the numerous types of molds and cavities which can be utilized.

Although only one ejector pin 22 is shown in the mold in FIG. 1, it is understood that several ejector pins are typically utilized in a mold in order to eject the molded part from the mold. In this regard, the ejector pins are typically positioned in a uniform manner around the mold cavity such that a uniform force can be provided on the molded part to eject it from the mold after the molded part is cooled and hardened and the mold is opened.

Figure 4:
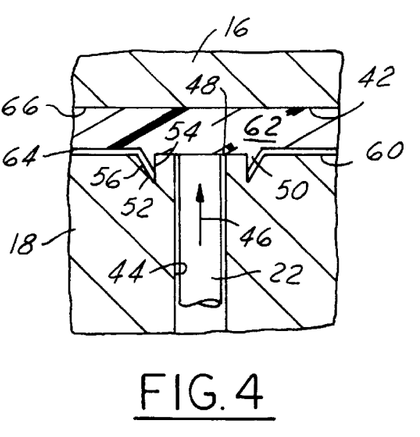
FIG. 4 is an enlarged view of the area shown by the circle indicated by reference numeral 4 in FIG. 1.

An enlarged view of the ejector pin 22 is shown in FIG. 4. Each of the ejector pins 22 are positioned in a bore 44 in the core portion 18 of the mold 15 and operated by a reciprocal mechanism (not shown), which typically uses hydraulic pressure in its operation. As indicated by arrow 46 in FIG. 4, the ejector pin is moved upwardly toward the mold cavity after the mold is opened in order to force and eject the hardened molded part from the mold core. The dimensional relationship between the outer diameters of the ejector pins 22 and bores 44 is machined to be as close as possible in order to prevent plastic from entering the annular gap 48 between the ejector pin and bore. In this regard, the tolerances cannot be so small or tight, however, that the ejector pin cannot be freely movable in the bore and thus some annular gap is present by necessity.

It is also necessary to provide a seal around each of the ejector pins such that gas injected into the mold cavity along the inside of the molded part does not escape down the annular gap 48 between the ejector pin and bore or force plastic material into it. For this purpose, an annular seal 50 is provided on the part. The annular seal 50 is formed by a wedge-shaped recess 52 formed in the mold core 18.

The wedge-shaped recesses 52 have an inner surface 54 which is substantially parallel to the longitudinal access of the ejector pins 22 and/or substantially perpendicular to the longitudinal direction of the mold cavity 42. The recesses 52 also have annular slanted surfaces 56. When gas is injected through gas injector pin 20 into the mold, the gas flows along the inner surface 60 of the mold (adjacent the inside surface of the molded part 62), and forms a gas layer or blanket 64 between the molded part and surface 60 as the gas compresses the plastic material toward the opposite wall or surface 66 of the mold cavity.

The size and depth of the recesses forming seal members 50 are sufficiently small relative to the thickness of the molded part such that the plastic cools and hardens ("freezes-off") against the surfaces 54 thus allowing the injected gas blanket 64 to force the sealing members 50 against the cylindrical surfaces 54 providing a tight seal.

Figure 7:
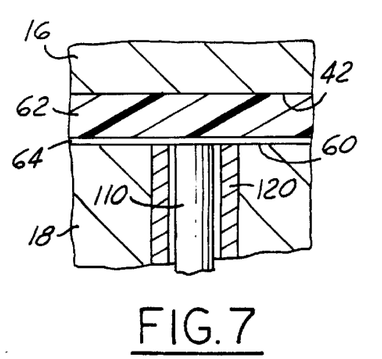
FIG. 7 depicts an alternate gas pin which can be utilized with the present invention.

The gas formed in gas layer 64 is injected into the mold cavity 42 by the gas injector pin 20 as shown in FIG. 1. In this regard, it is understood that there can be a plurality of gas injector pins 20 in the mold, depending on the size and configuration of the part being molded. In FIG. 1, only one gas injector pin 20 is shown for illustrative purposes, and the pin shown is only representative of the gas pins that can be used. There are numerous gas pins known today which can be used in a plastic molding process in accordance with the present invention. For example, stationary or moveable pins in sleeve members could be utilized, such as pin 110 in sleeve member 120 shown in FIG. 7. If desired, a standard ejector pin could be used as the gas pin member. It is also possible to use a valve gate bushing to inject the resin and gas into the mold, manifold or melt stream anywhere in the system, such as the mechanism and system described in U.S. Pat. No. 5,882,693, the disclosure of which is hereby incorporated by reference herein.

Gas pin 20 includes a body member 70 with a base member 72 at one end and a metal porous member 74 at the cavity end. A plug member 76 is used to retain the pin 20 in the mold half 18. The body member 70 has a gas channel or conduit 78 which transports gas from a gas supply 80 external to the mold to and through the porous member 74.

The metal porous member 74 can be made of any porous metal material, but preferably is made from stainless steel. As shown in more detail in FIG. 5, the porous member 74 allows gas to flow through it from the passageway 78 into the mold cavity 42 forming the gas layer 64 between the mold cavity and one side of the molded part 62. Preferably, the porous member 74 is circular in shape and has an upper surface 82 which is aligned with the lower surface 60 of the mold cavity.

Figure 5:
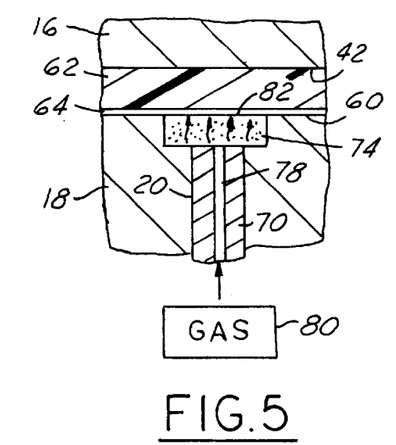
FIG. 5 is an enlarged view of the area indicated by the circle referenced with number 5 in FIG. 1.

In this manner, when the plastic material 40 is injected into the mold cavity 42 to form the plastic part, gas is injected into the cavity along one surface (the "backside") of the plastic material forcing or compressing the material against the opposite surface 66 of the mold cavity. The pressurized gas is maintained in the mold until the plastic material is self supporting. This produces a superior finish on the outer or appearance side of the molded part. This is often called a Class A surface.

It is also possible in accordance with the present invention to only provide pressurized gas on certain selected portions or areas of the backside of the molded part. This may be all that is necessary to provide a class A surface on the entire opposite (appearance) side, or only at preselected areas where such a surface is desired.

Preferably, the amount of plastic material which is injected into the mold cavity is not sufficient to entirely fill the mold cavity, but sufficient to leave a slight amount of clearance such that when the gas is injected into the mold cavity, an appropriate gas layer is formed. In this regard, the injected plastic material should be sufficient to fill 93–99.9 percent of the volume of the mold cavity, and preferably approximately 96.5 to 99.9 percent.

In accordance with the present invention, a seal is also formed at the extremities or extreme ends of the molded part in order to prevent gas which is injected from the gas injector pins 22 from escaping from the mold or from the migrating around the ends of the part and contacting the outer surface of the part. A preferred seal for this purpose is shown in FIG. 6.

The outer end or extremity 62A of the molded part 62 is formed adjacent the mold parting line 17 between the mold core and mold cavity portions. Seal member is referred to generally by the reference numeral 90. In order to form the seal 90, a wedge-shaped recess 92 is formed in the mold core 18. The recess 92 has a first surface 94 which proceeds across the width of the portion 62A and an angled or slanted portion 96. The size and configuration of the recess 92 is sufficiently small in order to allow the sealing member 90 to set up relatively quickly such that gas formed in the gas layer 64 will provide pressure against the sealing member 90 and force it against surface 94 creating the necessary seal. As indicated, the sealing member 90 prevents the gas that is injected into one side of the mold cavity from proceeding out of the mold along mold parting line 17 and/or from proceeding around the outer surface of the part along surface 66.

Figure 6:
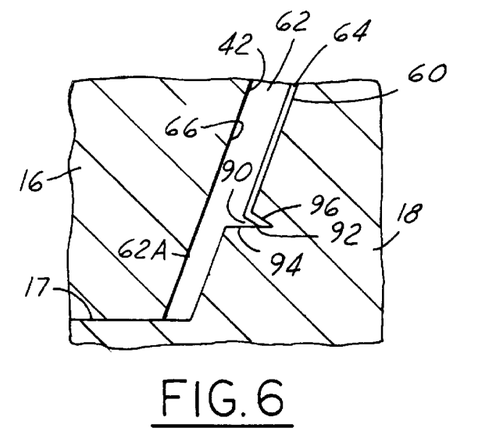
FIG. 6 is an enlarged view of the area of the mold shown in FIG. 1 and referenced by the circular area indicated by reference numeral 6.

In FIG. 6, the seal member 90 as portion to extend generally transverse to the adjacent position of the part 62 and generally parallel to the mold part line 17. Numerous other orientations of the seal member 90 are possible, such as generally parallel to the adjacent part portion (and thus generally transverse to the mold part line) and the like. The seal members, such as 90, also are sufficiently small or thin such that they will not interfere with the opening of the mold and removal of the part. If the seal members do interfere, they are sufficiently small and will be bent out of the way or be sheared off during opening of the mold.

Figure 9:
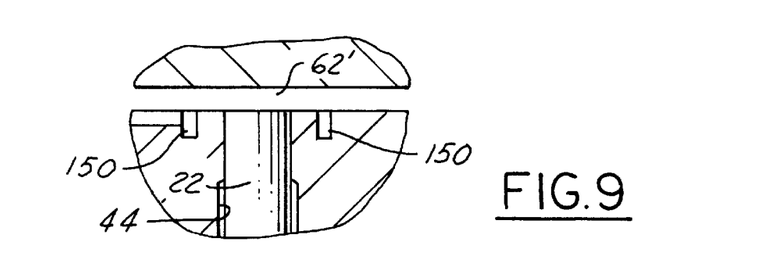
FIG. 9 illustrates an alternate gas seal member configuration.

Also, wedge-shaped seal members are described above, it is also possible to provide sealing members with other shapes and configurations, such as square, rectangular, triangular, and the like—or combinations of any of these. In this regard, a rectangular sealing member 150 is shown in FIG. 9.

Figure 10:
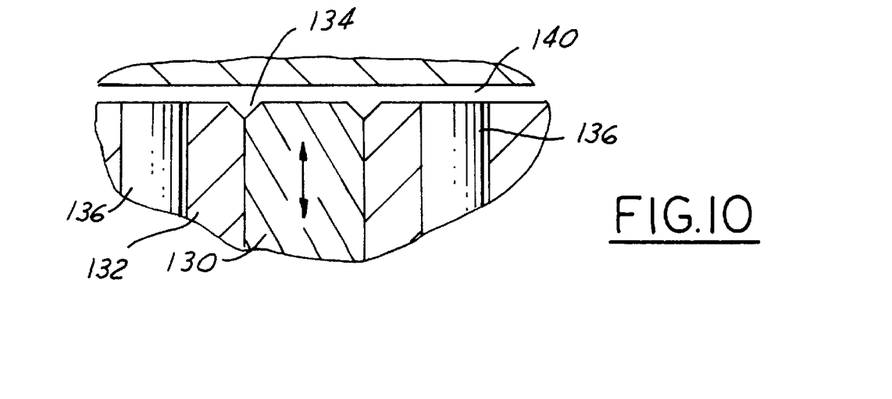
FIG. 10 illustrates a gas seal used with a slide core member in the mold.

If a moveable mold member is utilized in the molding process, such as a slide core member which is commonly used to create undercut formations in molded parts, then a separate sealing groove is utilized around the perimeter of the moving core member. This is shown in FIG. 10 where a slide core member 130 is provided in a cavity mold portion 132, and an annular "V" shaped groove 134 is provided around the perimeter of the core member 130. A pair of gas injector pins 136 are also provided in the mold member 132. Then the plastic part 140 is formed, the sealing groove 134 prevents the gas from escaping down the sides of the slide care member. Also, although a "V" shaped groove 134 is illustrated, it is to be understood that other shapes of sealing members, such as square, rectangular, etc. could be utilized.

Figure 11:
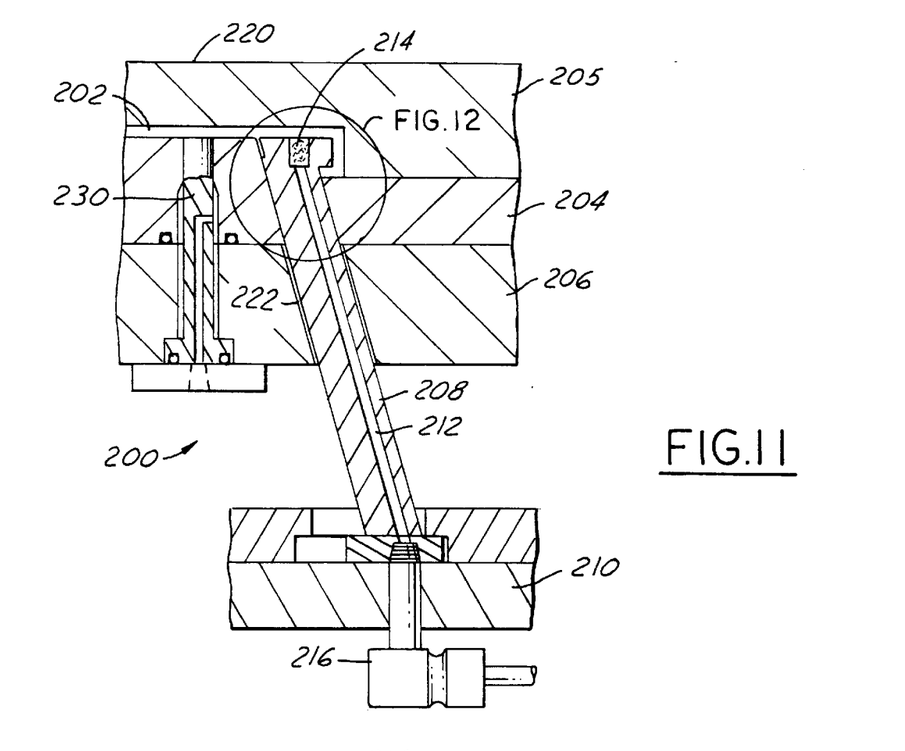
FIG. 11 illustrates another use of the invention with another embodiment in which a slide core member is utilized.
Figures 12, 13:
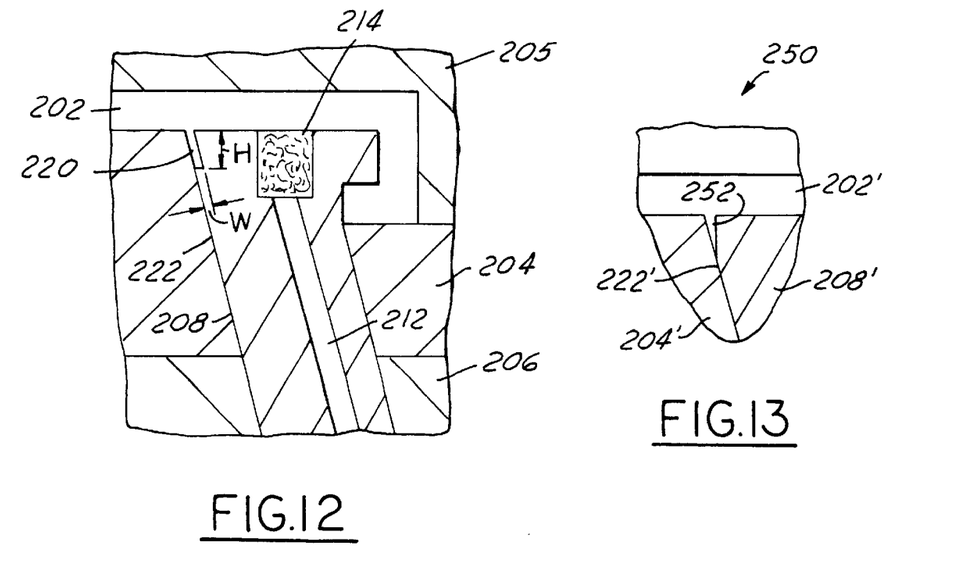
FIG. 12 is an enlarged view of a portion of FIG. 11.
FIG. 13 illustrates an alternate seal member for use with the embodiments shown in FIGS. 11 and 12.

Another embodiment 200 of a slide core mechanism is shown in FIGS. 11 and 12, with FIG. 12 being an enlarged view of the portion of FIG. 11 designated by the circle labeled "FIG 12." In this embodiment, a mold cavity 202 is provided between a mold core member 204 and a mold cavity member 205. The mold also has a back up plate 206 and a sliding core member 208. The sliding core member is attached to and operated by a knock-out frame mechanism 210.

Gas entry into the cavity 202 is provided through a channel or passageway 212 in the sliding core member 208. A sintered metal porous member 214 is positioned at the outlet end of the gas passageway and used to allow gas to enter the cavity 202 and at the same time prevent molten plastic from entering the gas passageway. The opposite end of the gas passageway is connected to a gas supply or connector 216. A thin sealing channel 220 is provided along the interface 222 between the sliding core member 208 and the mold core member 204 and used to prevent molten plastic from being injected into the interface. Preferably, the sealing member has a width "W" of between 0.002 to 0.010 inches (again preferably about 0.003 inches) and a height or depth "H" of between 0.003 inches to 0.010 inches (preferably about 0.003 inches).

The channel 220 used to form the sealing member can be formed in the sliding core member 208, as shown in FIGS. 11–12, in the adjacent mold core member, or partially in both members.

A gas pin injector member 230 is also provided in order to supply gas into the mold cavity. As set forth above, the sealing member can have a wide variety of sizes and shapes—and an alternate embodiment 250 utilizing a triangular sealing member 252 situated between the mold core member 204' and the sliding core member 208'.

As shown in FIG. 1, the plastic part that is molded in the mold cavity 42 has a plurality of ribs or bosses 100 thereon. The ribs 100 are used to provide reinforcement and support for the outer wall or surface 63 of the molded part 62. In this regard, the present invention has particular application in the formation of molded plastic housings, such as computer console cabinets, television cabinets, and the like where the walls are relatively thin (on the order of 1.5–2.5 mm) and require reinforcements at various points in order to stiffen them and keep them from buckling or warping.

Figure 2:
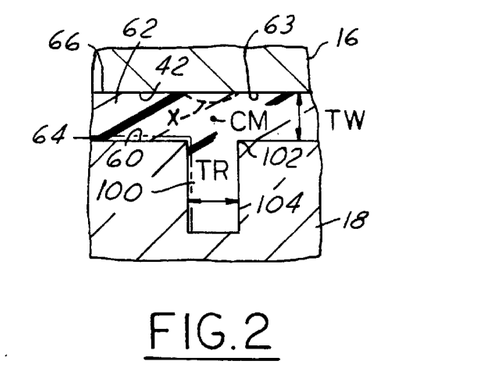
FIG. 2 is an enlarged view of a portion of the system shown in FIG. 1, the enlarged portion being indicated by the circular area designated with reference numeral 2.
Figure 3:
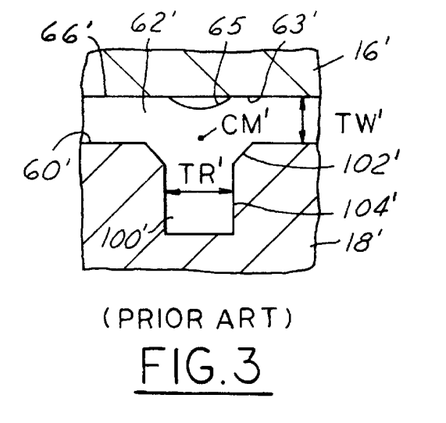
FIG. 3 is an enlarged view similar to FIG. 2, but showing a prior art system.

As shown in FIG. 2, the shape of the intersection between the rib 100 and the wall of the part 62, together with the ratio of their relative thicknesses, is significant. The corners 102 between the walls 104 forming the rib 100 and the inner surface 60 of the mold cavity are essentially right angles. In this regard, the radii of the fillets should be less than 1.0 mm. This is in contrast to known molding processes as shown in FIG. 3, which have radii or fillets 102' of several mm or greater between the walls 104' and 60'. In the system shown in FIG. 3, the radiuses or fillets 102' at the corners between the ribs 100' and the wall of the part 62' provide a thicker and larger mass of plastic material at that point. This creates a center of mass (CM') which is closer to the lower surface 60' of the mold cavity 42 than the upper outer wall 63'. (The CM' is greater than 50% of the distance from surface 63' to surface 60'.) In this regard, typically in known plastic injection molding processes, due to the shapes and configurations of the molded parts, the center of mass CM' of the plastic material at rib/wall intersections are greater than 50% of the distance TW between the outer or appearance surface 66' and the backside of the molded part 62'. As a result, when the part 62' cools, hardens, and shrinks, a sink mark 65 is typically formed on the outer or appearance surface 63' of the molded part. This is unacceptable for high quality finishes of molded plastic parts.

In contrast, with the present invention, as shown in FIG. 2, the sharp corners 102 between the reinforcing ribs 100 and molded part 62 position the center of mass (CM) closer to the upper surface 63 thus eliminating sink marks. The eliminated sink marks as indicated by the letter "X" in FIG. 2. With the present invention, the center of mass (CM) of the plastic material at the rib/wall intersection is less than 50% of the distance TW between the outer or appearance surface 66 and the backside of the molded part. In this regard, preferably, the center of mass CM should be as close as possible to the outer or appearance surface of the part, on the order of 20–30% of the wall member thickness from the outer or appearance side of the wall member.

Also, in accordance with the present invention, the ratio of the thickness TR of the reinforcing rib 100 relative to the thickness TW of the wall of the molded part should be no greater than 1.4 to 1.0 (1.4:1). The preferred range of ratios for these parts is 1.3:1 to 1:1. This retains the position of the center of mass CM in an acceptable position such that sink marks are not formed.

In the prior art process, in contrast, as shown in FIG. 3, the thickness TR' of the rib 100' is typically about twice the thickness TW' of the wall of the part 62'. Parts with this configuration would have ratios of approximately 2:1. Such a relative difference in thicknesses positions the center of mass at a significant distance from the surface 63' allowing sink marks to be formed.

The two halves or portions 16, 18 of the mold 15 are cooled by, for example, circulation of a cooling fluid in passageways or channels (not shown) in the mold halves in a conventional manner. The relative thicknesses of the rib members relative to the walls of the molded part allow the cooling effect of the mold halves to cool the entire intersection between the ribs and walls relatively uniformly. Although there may be some minor unbalance in the cooling of the molded part due to the presence of a gas layer 64 between the molded part and the mold core portion 18, maintenance of the ratio TR to TW in the range of 1:1 to 1.4:1 overcomes any cooling imbalance. In this regard, the less material that is injected into the mold (e.g. 97 percent) the smaller the ratio that can be used (e.g. 1:1). Similarly, if a larger volume of plastic material is injected into the mold (e.g. 99.5 percent) a larger ratio between TR and TW, such as 1.4 to 1, is typically utilized.

Although a range of ratios from 1.4:1 to 1:1 is contemplated with the use of the present invention, preferably the range of ratios is between 1.3:1 to 1:1.

Once a gas layer 64 is formed, the heat transferred to the mold core 18 is reduced or decreased while the heat transfer from the mold cavity portion 16 stays relatively constant. The cooling effect of the mold cavity portion 16 on the molded part also increases as pressure of the gas in the form of a gas blanket compresses and forces the plastic material permanently and uniformly against the mold cavity surface and away from the core surface.

In order to lengthen the cooling period of the molten plastic and thus provide more time for the plastic melt to be manipulated in the mold, heated or superheated gas (e.g. at 300° F.) could be utilized. This allows recesses in the mold cavity to be filled in better and allows better parts to be formed in many applications.

In accordance with the process with which the present invention is used, the molten plastic material is first injected into the mold cavity from the injection molding machine 12. As indicated above, the amount of plastic material injected into the mold cavity 42 is between 93–99.9 percent of the volume of the mold cavity. Once the plastic is injected into the mold cavity, gas is introduced and injected into the mold cavity by gas injector pins 20. The gas is introduced along the inner surface of the molded part and forms a gas layer along the entire wall adjacent the inner surface 60 of the mold cavity except for the areas sealed off by seal members (50 and 90). The gas is pressurized and forces and compresses the plastic material against the opposite surface of the mold cavity creating a strain-free superior finish on the part.

Once the part has cooled and hardened, it is then possible to vent the gas from the mold cavity. This can be done in any conventional manner. It is also possible to merely open the mold, that is to separate the two mold halves 16 and 18, and allow the gas to escape naturally into the atmosphere. Preferably, the gas pressure in the mold is first reduced sufficiently before the mold is opened.

In this regard, any gas remaining in the gas layer area in the mold cavity when the mold is opened will help free the molded part from the mold core member 18 and assist in ejecting the molded plastic part from the mold.

In accordance with the present invention, the mold cavity must be sufficiently full to obtain the definition to the full extent on the outer surface of the part. The pressure of the gas layer or blanket essentially provides a final pack pressure on the part. Since the gas layer and gas pressure is uniform along the inner surface of the mold cavity, the pressure applied to the part along the outer surface is also uniform, thus creating a more acceptable final molded part.

The volume of melted plastic material which is injected into the mold cavity is of a predetermined amount to substantially fill the mold cavity but of a volume less than that necessary for complete packing. As indicated above, in accordance with the present invention, the volume injected is preferably in the range from 93–99.9 percent of the total volume of the cavity, and more preferably about 96.5–99.9 percent of the total volume.

The inert pressurized gas, which preferably is nitrogen, is injected into the mold cavity 42 through the gas injector devices 20 in order to pressurize the core side of the cavity and force the melted plastic material against the opposite surfaces of the mold. Preferably, to assure uniformity of resin distribution, the gas injector devices are symmetrically disposed in the mold and connected to gas sources 80 at common predetermined pressures. While the gas injector devices can be separately connected to separate gas sources, they also can be connected to a common pressure source.

If desired, it is possible to reclaim and reuse the gas used in the injection molding process. Gas can be vented back through the gas injector devices, or in a separate gas venting device (not shown) and directed to a nitrogen receiver and storage container. Systems for reclaiming gas used in this manner are known in the industry.

Figure 8A:
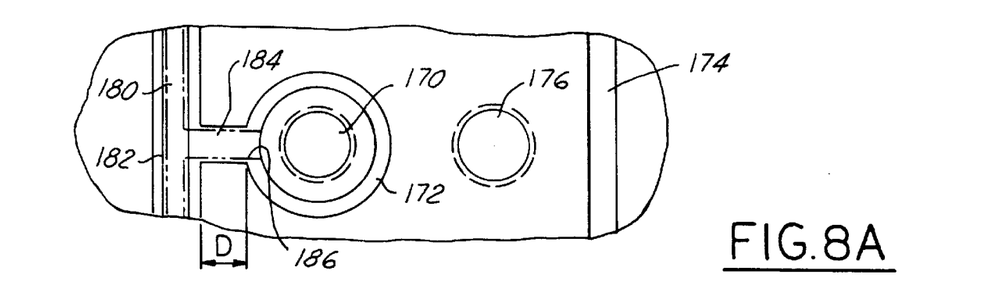
FIGS. 8A and 8B illustrate still another embodiment of the invention which utilizes a groove in order to direct gas into a wall, rib or fillet.
Figure 8B:
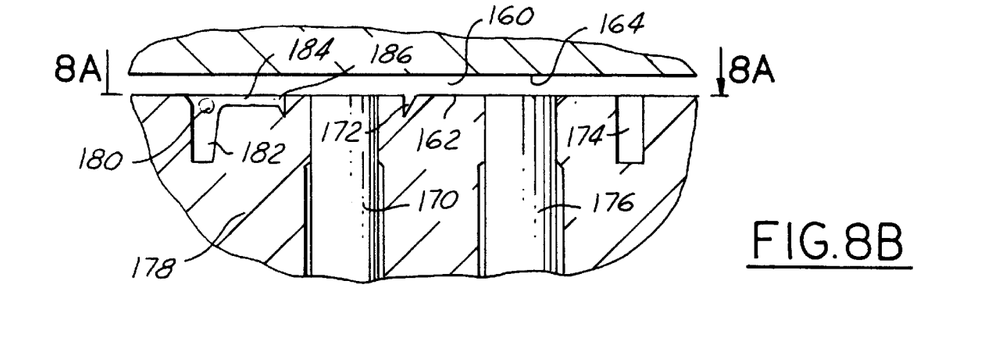

A further embodiment of the invention is shown in FIGS. 8A and 8B, with FIG. 8A being a top elevated view and FIG. 8B being a side elevational view. In this embodiment, the "back-sided" gas pressurization system as described above is combined with a gas-assisted injected molding system. The latter system is used to create a hollow channel in a wall, rib, fillet or other desired portion of the molded part. The gas is injected along the back side 162 of the part 160 being molded to press or compress the part against the opposite wall 164 of the mold cavity. The gas is injected through one or more gas pins, one of which 170 is shown with a wedge-shaped sealing member 172 around it. A reinforcing rib 174 is provided on the backside of the part and at least one ejector pin 176 is provided in the mold to help eject the part from the mold 178 after the part has cooled and hardened. A hollow cavity or channel 180 is provided in member 182 which could be another reinforcing rib as shown, an outer wall of the molded part, etc. The gas channel 180 could also be provided in a fillet adjacent a rib or wall member.

In order to allow or provide gas to form the channel 180, the gas pin 170 is either provided sufficiently close to the rib or wall member 182, or a channel or groove 184 is provided extending from a gap 186 in the wall of the sealing member 172 adjacent to the rib/wall member 182. In order to allow the gas to migrate from the injection pin 170 to the rib/wall member 182 without a groove, the distance "D" should be in the range of one-sixteenth of an inch to one inch (¹⁄₁₆"–1.0").

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A method of injection molding a plastic product having a first wall member with an outer appearance surface and a backside surface and a first reinforcing rib member positioned on said backside surface, the method comprising the steps of:

providing a mold cavity;

injecting a molten plastic material into the mold cavity;

injecting gas into the mold cavity along said backside surface of the plastic material and forcing the outer appearance side of the plastic material against a first surface of the mold cavity;

positioning the center of mass of the plastic material in said first wall member adjacent said first reinforcing rib member closer to the outer appearance surface of the molded product then the backside surface of the molded product, wherein the formation of sink marks on the outer appearance surface of the plastic product opposite said first reinforcing rib member are avoided;

wherein the intersection of the first wall member and the first reinforcing rib member is substantially at right angles, with the intersection having radii of less than 1.0 mm.

2. The method as recited in claim 1 wherein the center of mass is positioned at a closer distance at least 50% of the distance between said outer appearance surface of the molded product than the backside of the molded product.

3. The method as set forth in claim 1 wherein said gas is introduced into the mold cavity by at least one gas injection pin member.

4. The method as set forth in claim 3 wherein said gas injection pin member is positioned adjacent a second rib member in order to form a gas channel in said second rib member.

5. The method as set forth in claim 4 wherein said gas injection pin member is positioned in the range of 1/16" to 1.0" adjacent said second rib member.

6. The method as set forth in claim 4 wherein a sealing member is provided around said gas injection pin member.

7. The method as set forth in claim 6 wherein a groove is provided in said sealing member and in communication with said second rib member in order to supply gas to form said gas channel.

8. The method as set forth in claim 1 wherein said injected gas is superheated gas.

9. A method of injection molding a plastic product having a first wall member with an outer appearance surface and a backside surface and a first reinforcing rib member positioned on said backside surface, the method comprising the steps of:

providing a mold cavity;

injecting a molten plastic material into the mold cavity;

injecting gas into the mold cavity along said backside surface of the plastic material and forcing the outer appearance side of the plastic material against a first surface of the mold cavity;

positioning the center of mass of the plastic material in said first wall member adjacent said first reinforcing rib member closer to the outer appearance surface of the molded product then the backside surface of the molded product, wherein the formation of sink marks on the outer appearance surface of the plastic product opposite said first reinforcing rib member are avoided;

wherein the center of mass is positioned at a closer distance at least 50% of the distance between said outer appearance surface of the molded product than the backside of the molded product.

* * * * *